March 8, 1949.　　　　D. D. STREID　　　　2,464,063
AIRCRAFT SUPERCHARGER LUBRICATION
Filed April 12, 1943
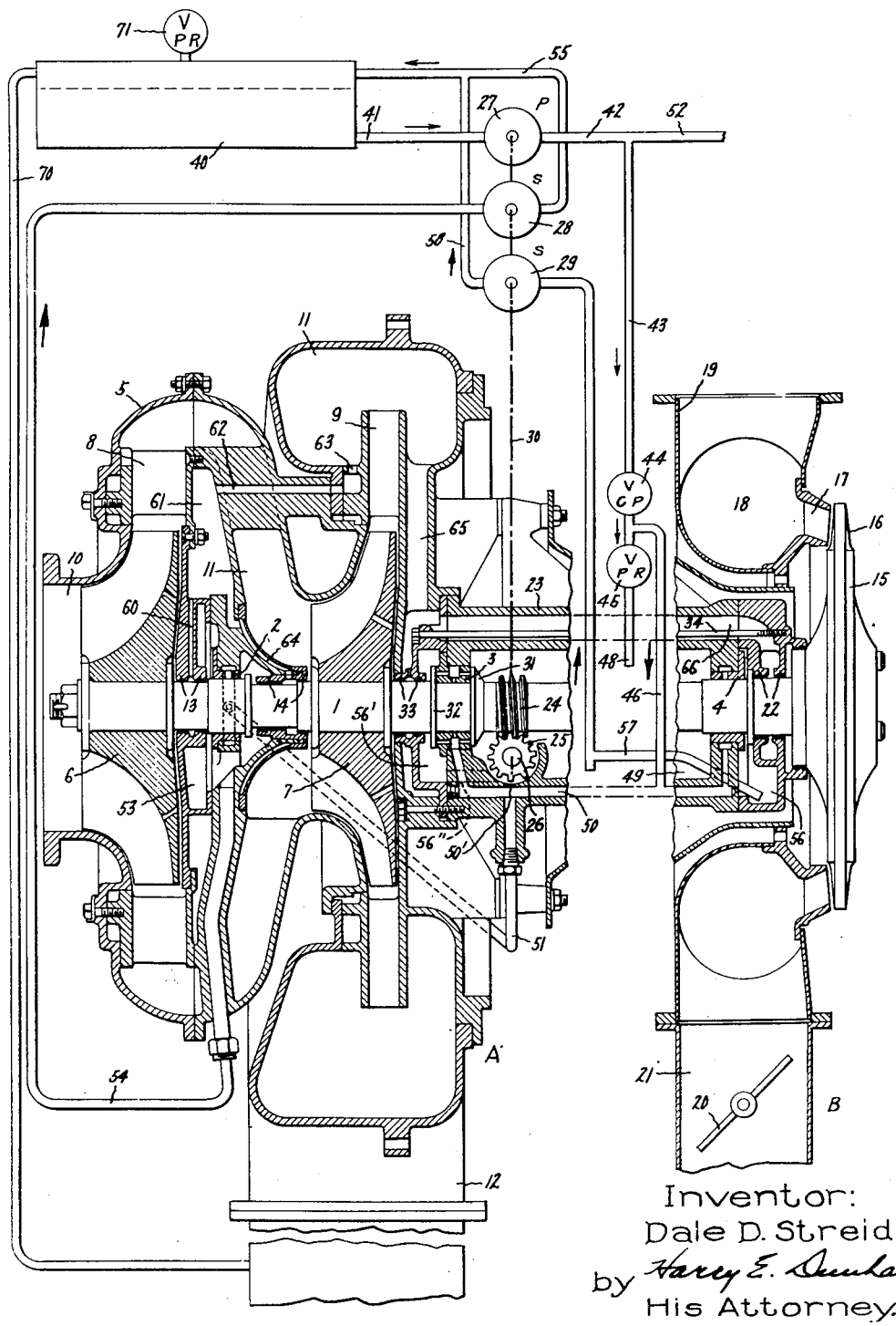
Inventor:
Dale D. Streid,
by Harry E. Dunham
His Attorney.

Patented Mar. 8, 1949

2,464,063

UNITED STATES PATENT OFFICE 2,464,063

AIRCRAFT SUPERCHARGER LUBRICATION

Dale D. Streid, Saugus, Mass., assignor to General Electric Company, a corporation of New York Application April 12, 1943, Serial No. 482,737

5 Claims. (Cl. 184—6)

1

The present invention relates to aircraft superchargers and especially to aircraft superchargers intended for operation at high altitudes, altitudes of the order of 30,000 to 40,000 feet, for example. The invention is well adapted for use in turbosuperchargers and it is this application of my invention which I have elected specifically to illustrate and describe. It is to be understood, however, that this is only by way of example and that the invention may be used wherever found applicable.

A problem met with in the operation of aircraft superchargers at high altitudes is that of lubricating the bearings, the difficulties being due to the extremely low atmospheric pressure and temperature. For example, at 40,000 feet altitude, the atmospheric pressure is only 4.36" mercury and the atmospheric temperature is —67° F. The low pressure and temperature affect adversely the oil pumps, decrease in pressure causing a decrease in the volume of oil which the pump will deliver and decrease in temperature causing an increase in the pressure drop in the oil line, which reduces the pressure at the inlet to the pump by the amount of the pressure drop. Thus the effects of pressure and temperature are cumulative in reducing the pressure at the oil pump inlet. This means that if an oil pump is of a capacity suited to lower altitudes, it has insufficient capacity at higher altitudes while if of a capacity for higher altitudes, it has excess capacity at lower altitudes and additional weight, the latter a thing of considerable importance in airplane design.

The object of my invention is to provide an improved lubricating system for use on an aircraft and especially for superchargers, and for a consideration of what I believe to be novel and my invention, attention is directed to the following specification and to the claims appended thereto.

In the drawing, the figure is a sectional view of a turbosupercharger embodying my invention. In the figure, the structure is shown as being separated into two parts, A and B, the part B being moved somewhat away from part A in order to illustrate better the structure. It will be understood that actually the parts A and B are integral. With respect to this and also with respect to certain other parts, the figure is diagrammatic.

Referring to the drawing, I indicates the shaft of the turbosupercharger. The shaft I is supported in three bearings 2, 3 and 4. Bearing 2 is carried in and forms a part of the housing 5

2 of a two-stage centrifugal compressor. The impeller for the first stage of the compressor is indicated at 6 and the impeller for the second stage of the compressor is indicated at 7. These impellers are suitably mounted on shaft I. The diffuser for the first stage of the compressor is indicated at 8 and the diffuser for the second stage of the compressor is indicated at 9. Air enters the compressor through the first stage inlet 10 and after being discharged from the diffuser 8 flows through an annular passage 11 to the inlet of impeller 7. Air discharged from the impeller 7 flows through diffuser 9 to an annular discharge scroll 11 from which it is discharged through an outlet 12. In the compressor casing on opposite sides of bearing 2 are packings 13 and 14 which may be of any suitable type. In the present instance they are shown as being of a type having teeth packing against surfaces of shaft I, this being the type of packing I now prefer.

On the other end of shaft I is a gas turbine wheel 15 provided with a ring of buckets 16 to which actuating fluid, usually exhaust gases from an aircraft engine, is supplied through nozzles 17 from a nozzle box 18. The inlet to the nozzle box is indicated at 19 and the waste gate for controlling the supply of gases to the turbine wheel is indicated at 20, it being located in a passage 21 communicating with the atmosphere. Located between bearing 4 and the turbine wheel is a suitable packing 22 shown in the present instance as being of a type provided with teeth which pack against the adjacent surface of shaft 1. The packing 22 is attached to the end of and is carried by a gear and pump housing 23.

Located in housing 23 on shaft I is a worm 24 which drives a worm wheel 25 carried by a shaft 26 journaled in the walls of housing 23. Shaft 26 drives three pumps, a pressure pump 27 and two scavenger pumps 28 and 29. In actual practice, pumps 27, 28 and 29 are mounted in housings connected directly with housing 23, being suitably located on opposite sides of the housing. For purposes of illustration, however, these pumps are shown diagrammatically, the dot and dash line 30 indicating that they are driven from shaft 26. The bearings 3 and 4 are located at opposite ends of housing 23. On opposite sides of bearing 3 are suitable thrust collars 31 and 32. At 33 is a suitable packing carried by housing 23 and located between bearing 3 and compressor impeller 7. In the present instance it is shown as being of a type provided with teeth which pack against, i. e. form close clearances with, the adjacent surface of shaft 1, but it may be of other type if found desirable. Packings 22 and 33 are suitably connected to housing 23 by means of circumferentially spaced bolts 34, the walls which carry the packings fitting against the end walls of casing 23.

An oil tank from which lubricant is supplied to the bearings of the turbosupercharger is indicated at 40. It is connected to pressure pump 27 by a pipe 41. The discharge side of pump 27 is connected by a pipe 42 and a branch pipe 43 to the several bearings of the turbo-supercharger. In branch pipe 43 is a suitable pressure reducing valve 44 which reduces the pressure delivered by the pump to a value suitable for the bearings and such pressure is held by a pressure relief valve 45, the pipe section 46 which leads directly to the bearings being connected between the two valves. Excess oil is discharged through pressure relief valve 45 to a pipe 48 from which it flows into a sump 49 in the lower part of housing 23. Valves 44 and 45 are shown diagrammatically. In actual practice, they may be built directly into housing 23, the several conduits indicated as pipes being in the form of passages in the housing. Pipe 46 is illustrated as connecting with a passage 50 in housing 23 which at its right-hand end conveys lubricant to bearing 4 and at its left-hand end conveys lubricant to bearing 3 and to the gears 24, 25 through a passage 50'. Passage 50 is connected by a pipe 51 to bearing 2, the pipe serving to convey lubricant to bearing 2. Thus, it will be seen that pressure pump 27 serves to supply lubricant at a suitable pressure to the three bearings 2, 3 and 4 and to the worm gearing 24, 25.

Ordinarily, pressure pump 27, in addition to supplying the bearings with lubricant, supplies pressure to other operating parts, such as for example governing mechanism. The branch pipe 52 indicates a pipe line leading to such other mechanism. Ordinarily, such mechanism requires a pressure higher than that required by the bearing. Accordingly, a pressure pump which delivers oil at a suitable pressure for the other mechanism is provided and valves, as indicated at 44 and 45, are utilized to reduce this pressure to a value suitable for the bearings.

Oil discharged from bearing 2 flows into a sump 53 which sump is connected by a pipe line 54 with the inlet of scavenger pump 28, the discharge side of scavenger pump 28 being connected by a pipe line 55 to oil tank 40. The oil discharged from bearings 3 and 4 and from gears 24, 25 flows into sump 49 and into spaces 56 and 56' which form a part of sump 49, the space 56' being indicated as connected with the central portion of sump 49 by a passage 56" shown in dotted lines. From sump 49 the oil is conveyed by a pipe line 57 to the inlet of scavenger pump 29, the discharge side of which is connected in parallel to oil tank 40 by a pipe line 58.

The compressor casing walls which carry packings 13 and 14 and define sump 53 form a sealed housing in which the bearing 2 is located. Similarly, the walls which define housing 23 and the walls which carry packings 22 and 33 form a sealed housing in which bearings 3 and 4 are located.

Scavenger pumps 28 and 29 together have a capacity substantially greater than pressure pump 27. They are required, however, to return to the oil tank 40 only the oil pumped by pressure pump 27. This means that scavenger pumps 28 and 29 in addition to pumping oil pump also a considerable volume of air.

The respective packings 13, 14, 33 and 22 are connected at points intermediate between their ends by suitable passages to a region of pressure higher than ambient pressure such as, for example, a suitable pressure point of the compressor. In the present instance the connections are shown as being with the discharge side of a stage of the compressor, specifically the second stage. The packing 13 between its ends is connected to the discharge side of the second stage of the compressor by suitable passages 60, 61, 62 and 63; the packing 14 between its ends is similarly connected to the discharge side of the compressor by passages 64, 61, 62 and 63; the packing 33 between its ends is connected to the discharge side of the compressor by a passage 65, and the packing 22 between its ends is connected to the discharge side of the compressor by passages 66 and 65. The several packings may be made in sections as shown whereby there is provided between sections an annular chamber surrounding the shaft to which the pressure conduits are connected. Thus, each packing is connected between its ends with a region of higher pressure and such pressure tends to effect a flow of air from the intermediate point of the packing in each direction along the surface of the shaft. This flow of air serves effectively to prevent leakage of oil from the respective bearings, housings and sumps along the shaft. In addition to this, however, the arrangement effects another important result. The drop in pressure through the respective packing sections to the regions surrounding the respective bearings is relatively small so that there is built up around the respective bearings a pressure but slightly less than that on the discharge side of the second stage of the compressor. As a result, the bearing housings are, so-to-speak, supercharged. Since an aircraft supercharger operates to deliver air at substantially sea level pressure irrespective of the altitude of the aircraft, this means that the bearings are in substance operating at sea level atmospheric pressure at all times. In addition, the lubricant tank 40 is supercharged by providing means whereby there is maintained in tank 40 above the level of oil therein a pressure higher than ambient pressure, preferably a pressure corresponding substantially to atmospheric pressure at sea level. To this end, the lubricant tank above the level of the lubricant therein may be connected to a region of higher pressure, such as a stage of the centrifugal compressor and in addition, or in lieu of such connection, the usual air vent in the tank may be provided with or replaced by a suitable pressure relief valve. In the present instance, tank 40 is shown as being connected by a pipe line 70 to discharge conduit 12 of the centrifugal compressor and the tank is shown as being provided with a suitable pressure relief valve 71 which valve may be set to maintain a desired pressure in the tank. The scavenging pump means comprising pumps 28 and 29 pumps a certain amount of air and, if desired, pipe line 70 may be omitted and the tank supercharged by means of air pressure built up by the scavenging pump means. If desired, the pressure relief valve 71 may be replaced by a small orifice, the supercharging being then effected by the pipe line connection 70 without utilizing a pressure relief valve, the pressure in the tank being maintained because of the restricted flow through the small orifice.

The result of the foregoing arrangement is that the entire lubricating system for the supercharger is itself supercharged so that the pressure pump 27 and scavenging pumps 28 and 29 are operating actually under conditions comparable to sea level conditions irrespective of the altitude of the aircraft. As a result, the several pumps may be designed for sea level atmospheric pressure.

Inasmuch as the scavenger pumps 28 and 29 pump both oil and air, they serve to effect a continuous flow of air through the packings to the sumps, maintaining in the sumps a pressure lower than that supplied to the packings by the amount of the drop in pressure through the packings, which, as already stated, is relatively small.

By my invention wherein both the oil storage or supply tank and the bearings lubricated from it are supercharged, I provide a reliable lubricating system not affected by the ambient pressure of the atmosphere; and in the system I am enabled to utilize pumps and piping of sizes no larger than that required for sea level operation.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an aircraft powerplant including motor means and a compressor driven by the motor, the combination of a shaft, a bearing for the shaft, walls defining a housing which surrounds the shaft and in which said bearing is located, a packing means between an end wall of said housing and the shaft, conduits which connect said packing at a point between its ends with the compressor at a region of pressure higher than ambient pressure, a lubricant tank, pressure pump means connected with said tank and bearing for supplying lubricant to the bearing from which the lubricant flows into said housing, scavenging pump means connected with said tank and housing for returning lubricant from the housing to the tank, said scavenging pump means being of greater capacity than said pressure pump means, and a conduit connecting said tank to the compressor at a point of higher pressure than ambient pressure.

2. In an aircraft powerplant including motor means and a compressor driven by the motor, the combination of a shaft, a bearing for the shaft, walls defining a housing which surrounds the shaft and in which said bearing is located, a packing between an end wall of said housing and the shaft, conduits which connect said packing at a point between its ends with the discharge side of the compressor, a lubricant tank, pressure pump means connected with said tank and bearing for supplying lubricant to the bearing from which the lubricant flows into said housings, scavenging pump means connected with said tank and said housing for returning lubricant from the housing to the tank, said scavenging pump means being of greater capacity than said pressure pump means, and a conduit connecting the discharge side of the compressor to said tank.

3. In an aircraft powerplant including a motor means and a compressor driven by the motor, the combination of a shaft, a bearing for the shaft, walls defining a housing which surrounds the shaft and in which said bearing is located, packing means between an end wall of said housing and the shaft, a lubricant tank, pump means for circulating lubricant from said tank through said bearing and back to the tank, and conduit means connecting said bearing housing and said lubricant tank to the discharge side of the compressor for supercharging said tank and bearing housing.

4. A turbine having a rotor, a bearing for the rotor, a housing for the bearing having a scavenge chamber adjacent the bearing to collect oil from the bearing, and means for pumping oil from said chamber, in combination with means for maintaining pressure in said chamber, including a labyrinth seal around the shaft having one end adjacent the chamber with the passage for air through the seal communicating with said chamber and means for introducing gas under pressure to said seal between its ends, the gas under pressure working through the seal to said chamber.

5. A turbine for aircraft use having a rotor, a bearing for the rotor, a housing for the bearing having a scavenge chamber adjacent the bearing to collect oil from the bearing, and means for pumping oil from said chamber, in combination with means for maintaining pressure in said chamber independently of the surrounding atmospheric pressure, including a labyrinth seal around the shaft having one end adjacent the chamber with the passage for air through the seal communicating with said chamber, and means for introducing gas under pressure to said seal between its ends, the gas under pressure working through the seal to said chamber.

DALE D. STREID.

REFERENCES CITED

The following references are of record in the file of this patent:

UNITED STATES PATENTS

| Number | Name | Date |
|---|---|---|
| 1,871,662 | Carrier | Aug. 16, 1932 |
| 2,182,948 | Schjolin | Dec. 12, 1939 |
| 2,234,777 | Puffer | Mar. 11, 1941 |
| 2,266,107 | Waterfill | Dec. 16, 1941 |
| 2,370,581 | Reed | Feb. 27, 1945 |

FOREIGN PATENTS

| Number | Country | Date |
|---|---|---|
| 145,273 | Great Britain | July 2, 1920 |
| 189,713 | Switzerland | Nov. 1, 1937 |
| 309,791 | Great Britain | Apr. 18, 1929 |